United States Patent [19]

Yves et al.

[11] 3,763,017

[45] Oct. 2, 1973

[54] PROCESS OF INHIBITING DECOMPOSITION OF 1,1,1,2-TETRACHLOROETHANE

[75] Inventors: Correia Yves, Saint-Auban; Clair Rene, Savigny sur Orge, both of France

[73] Assignee: Produits Chimiques PECHINEY-Saint Gobain, Neuilly-sur-Seine, France

[22] Filed: June 9, 1970

[21] Appl. No.: 45,249

[30] Foreign Application Priority Data
June 18, 1969 France .............................. 6920314

[52] U.S. Cl. ........... 203/6, 260/652 P, 260/652.5 R
[51] Int. Cl. ...................... C07c 17/42, C07c 17/00
[58] Field of Search ..................... 260/652.5, 652 P; 203/6, 7; 252/170, 171

[56] References Cited
UNITED STATES PATENTS

| | | | |
|---|---|---|---|
| 3,076,040 | 1/1963 | Skeeters........................... | 260/652.5 |
| 2,721,883 | 10/1955 | Stevens............................ | 260/652.5 |
| 3,420,749 | 1/1969 | Dehn ............................ | 260/652.5 X |
| 3,441,620 | 4/1969 | McDonald ...................... | 260/652.5 |
| 3,564,061 | 2/1971 | Correia et al.................... | 260/652.5 |

*Primary Examiner*—Howard T. Mars
*Attorney*—McDougall, Hersh & Scott

[57] ABSTRACT

This invention is addressed to a new and improved method for inhibiting the decomposition of 1,1,1,2-tetrachloroethane and an inhibited composition formed thereby wherein an inhibitor consisting essentially of an aliphatic aldehyde, an aromatic aldehyde, chlorinated derivatives of the foregoing aldehydes which are soluble in 1,1,1,2-tetrachloroethane with other chlorinated solvents, or cyclic trimers of aliphatic aldehydes and mixtures thereof, and an organic phosphorus compound are added to a solvent composition containing 1,1,1,2-tetrachloroethane.

15 Claims, No Drawings

PROCESS OF INHIBITING DECOMPOSITION OF 1,1,1,2-TETRACHLOROETHANE

This invention relates to the inhibition of the decomposition of 1,1,1,2-tetrachloroethane or of mixtures of chlorinated hydrocarbons containing 1,1,1,2-tetrachloroethane.

It is known that 1,1,1,2-tetrachloroethane is unstable when subjected to heat in the presence of either metals, such as, among others, iron and its alloys, copper and its alloys, nickel and its alloys, or chlorides of various metals, and particularly chlorides of iron. For example, in the presence of ferric chloride, 1,1,1,2-tetrachloroethane is unstable to heat as is described in U. S. Pat. No. 2,593,451.

This instability results in the decomposition of 1,1,1,2-tetrachloroethane with the concomitant release of hydrochloric acid vapor and the formation of trichloroethylene and tarry residues.

The problem of the decomposition of 1,1,1,2-tetrachloroethane also exists when 1,1,1,2-tetrachloroethane is subjected to distillation, rectification, evaporation and/or concentration operations. In such operations, 1,1,1,2-tetrachloroethane is generally in admixture with other chlorinated hydrocarbons, particularly the $C_2$ chlorinated hydrocarbons, in the form of effluent from a reactor used in the manufacture of chlorinated hydrocarbons by numerous processes, including, among others, vapor phase or liquid phase, thermal or catalytic chlorination of hydrocarbons and-/or chlorinated hydrocarbons, or catalytic oxychlorination and dehydrochlorination. The isolation of a specific chlorinated hydrocarbon or of specific chlorinated hydrocarbons included in the reactor effluent requires the treatment of the reactor effluent mixture in distillation columns, evaporators, purifiers, exchangers and driers. This equipment, as well as the ducts which connect them, are frequently formed of metallic alloys containing iron, such as ordinary steel or stainless steel. It has been observed that decomposition of 1,1,1,2-tetrachloroethane arises principally in the liquid phase of the boiler at a temperature within the range of 80°-250°C., and that the rate of decomposition of the 1,1,1,2-tetrachloroethane is defined by the ratio of evolved hydrochloric acid to the molar flow of 1,1,1,2-tetrachloroethane. This rate of decomposition at the feed of the distillation column may attain as high as 0.50.

It is accordingly an object of the present invention to inhibit the decomposition of 1,1,1,2-tetrachloroethane and thereby improve the distillation, rectification, evaporation and or concentration operations to which 1,1,1,2-tetrachloroethane and mixtures of 1,1,1,2-tetrachloroethane with other chlorinated hydrocarbons which are brought into contact with surfaces catalyzing the decomposition of 1,1,1,2-tetrachloroethane.

According to the practice of the present invention, the inhibition of the decomposition of 1,1,1,2-tetrachloroethane is achieved by incorporating into 1,1,1,2-tetrachloroethane an inhibiting agent consisting essentially of a compound selected from the group consisting of aliphatic aldehydes containing two to seven carbon atoms, aromatic aldehydes containing seven to 12 carbon atoms, a chlorinated derivative of either an aliphatic or aromatic aldehyde or a cyclic trimer of aliphatic aldehyde containing one to three carbon atoms or mixtures thereof, and at least one organic derivative of phosphorus containing two to 28 carbon atoms which is soluble in 1,1,1,2-tetrachloroethane or in mixtures of 1,1,1,2-tetrachloroethane with other chlorinated solvents.

It has been found that the foregoing aldehydes can be used with organic derivatives of phosphorus, and particularly phosphoric esters, to provide a stabilized 1,1,1,2-tetrachloroethane composition in which the inhibiting effect is superior to the total effect provided by each of the components of the inhibiting composition.

Thus, when use is made of phosphoric esters alone, the decomposition rate of 1,1,1,2-tetrachloroethane can be reduced by an average of a factor of 3. Similarly, when use is made of one or more of the foregoing aldehydes alone, the decomposition rate can be reduced by a factor of about 2. However, when use is made of a mixture of inhibiting agents including one or more of the foregoing aldehydes and one or more phosphoric esters or the like, the decomposition rate can be reduced by a factor of about 10, clearly indicating that the use of both the aldehyde and the phosphorus compound is synergistic.

As the aldehyde, use can be made of a wide variety of compounds, including trioxane, paracetaldehyde, the cyclic trimer of propionaldehyde, chloral, propionaldehyde, cinnamaldehyde, anisaldehyde, salicylaldehyde, butyraldehyde, isobutyraldehyde and benzaldehyde. Preferred aldehydes are butyraldehyde, isobutyraldehyde, benzaldehyde or mixtures of either butyraldehyde or isobutyraldehyde with benzaldehyde.

It has been found that the amount of the alkehyde and the organic phosphorus compound which should be employed with 1,1,1,2-tetrachloroethane is dependent upon the gram-atom concentration of the contaminating metal, or the amount of metal present in the 1,1,1,2-tetrachloroethane or in mixtures of 1,1,1,2-tetrachloroethane with other chlorinated compounds in the dissolved or suspended state.

The amount of each of the inhibitors used in accordance with the present invention should generally be an amount sufficient to provide a ratio of at least one mole of the aldehyde and at least one mole of the organic phosphorus compound per gram-atom of metal. In accordance with the present practice of the invention, the aldehyde inhibitor is used in an amount such that there is an excess of aldehyde in an amount corresponding to from 2-100 moles of aldehyde per gram-atom of metal present.

Similarly, it is preferred that the quantity of organic phosphorus compound employed be such that there is an excess of organic phosphorus compound relative to the gram-atom concentration of the metal. This excess is preferably up to 10 times the proportion of one mole of organic phosphorus compound per gram atom of metal.

As the organic phosphorus compound, a wide variety of compounds well known to those skilled in the art can be used. Representative of such compounds are hexamethylene phosphoramide, tris-(beta-chloroisopropyl) thionophosphate, triphenylphosphine, diethylphenylphosphine, tributylphosphite, tetramethylpyrophosphate, and phosphites of alkyl-substituted phenols wherein the alkyl contains one to 12 carbon atoms, such as methyl, ethyl, etc., alkyl phosphates wherein the alkyl contains one to 12 carbon atoms, such as methyl, ethyl, propyl, butyl, pentyl, ete., aryl phosphates wherein the aryl group contains 6-10 carbon atoms, such as phenyl, toluyl, naphthyl, etc. Representative of alkyl and aryl phosphates are diethyl phosphate, diphenyl phosphate, tri-n-butyl phosphate, tri-isobutyl phosphate and tricresyl phosphate. Organic phosphorus compounds preferred in the invention are the tri-n-butyl, tri-isobutyl and tricresyl phosphates.

The inhibiting agents of the present invention can be incorporated into the 1,1,1,2-tetrachloroethane in a variety of ways. For example, the inhibitors can be added to the 1,1,1,2-tetrachloroethane, or a mixture of chlorinated compounds containing 1,1,1,2-tetrachloroethane either before introduction of the composition into an evaporator, distillation column, concentration column, or rectification column or as the chlorinated solvent is added to the column. Similarly, it is also possible to add the inhibitors to the composition in the boiler of the column. In order to obtain the optimum quantity of the inhibitors, it is frequently advisable to determine the gramatom concentration of the metal present in the 1,1,1,2-tetrachloroethane or in the mixture of chlorinated compounds containing 1,1,1,2-tetrachloroethane during the course of distillation, concentration, rectification or evaporation operations.

Having described the basic concepts of the invention, reference is now made to the following examples which are provided by way of illustration, but not by way of limitation, of the practice of the invention.

EXAMPLE 1

Into a continuous distillation column including a feed, a distillation reside, a distillate and an exhaust vent, there is introduced a mixture of organic chlorinated compounds containing 6 mg. of dissolved iron(0.107 milligram-atom) per kg. of mixture and having a molar composition given in the table hereinafter. To this mixture there are added 50 mg. of tricresyl phosphate, (0.136 millimole) and 50 mg. of n-butyraldehyde(0.69 millimole) per kg of mixture of chlorinated organic compounds. Distillation of this mixture is operated under a pressure of 1.4 bar and the average residence time at the boiler of the column is about 5 hours. The molar balance of the column is:

| Compounds | Feed in Moles | Residue in Moles | Distillate in Moles | Exhaust vent in Moles | Moles of trichloroethylene formed | Moles of 1,1,1,2-tetrachloroethane converted |
|---|---|---|---|---|---|---|
| HCl |  |  |  | 0.805 |  |  |
| CV$_2$ | 0.352 |  | 0.352 |  |  |  |
| T111 | 2.680 |  | 2.680 |  |  |  |
| Tri | 5.360 | 0.005 | 6.160 |  | 0.085 |  |
| T112 | 0.076 |  | 0.076 |  |  |  |
| Per | 0.179 |  | 0.179 |  |  |  |
| T4D | 48.000 | 25.150 | 22.045 |  |  | 0.805 |
| T4S | 27.500 | 27.500 |  |  |  |  |
| Penta | 15.460 | 15.460 |  |  |  |  |
| Heavy | 0.393 | 0.393 |  |  |  |  |
| Total | 100.000 | 68.508 | 31.462 | 0.805 | 0.805 | 0.805 |

Designation of the different abbreviations of the above-mentioned compounds are as follows:

HC1    Hydrochloric acid
CV$_2$    Vinylidene chloride
T111    1,1,1-trichloroethane
Tri    Trichloroethylene
T112    1,1,2-trichloroethane
Per    Perchloroethylene
T4D    1,1,1,2-tetrachloroethane
T4S    1,1,2,2-tetrachloroethane
Penta    Pentachloroethane
Heavy    $C_3$, $C_4$ chlorinated hydrocarbons It is found that the decomposition rate of the 1,1,1,2-tetrachloroethane is only about 0.0168.

By way of comparison, the three following tests are carried out as follows:

a. Distillation of the same mixture of chlorinated organic compounds as that of Example 1 is operated but without any addition of inhibiting agent.

The molar balance of the column is the following:

| Compounds | Feed in Moles | Residue in Moles | Distillate in Moles | Exhaust vent in Moles | Moles of trichloroethylene formed | Moles of 1,1,1,2-tetrachloroethane converted |
|---|---|---|---|---|---|---|
| HCl* |  |  |  | 10.1 |  |  |
| CV$_2$ | 0.352 |  | 0.352 |  |  |  |
| T111 | 2.680 |  | 2.680 |  |  |  |
| Tri | 5.360 | 0.050 | 15.410 |  | 10.1 |  |
| T112 | 0.076 |  | 0.076 |  |  |  |
| Per | 0.179 |  | 0.179 |  |  |  |
| T4D | 48.000 | 15.500 | 22.400 |  |  | 10.1 |
| T4S | 27.500 | 27.500 |  |  |  |  |
| Penta | 15.460 | 15.460 |  |  |  |  |
| Heavy | 0.393 | 0.393 |  |  |  |  |
| Total | 100.000 | 58.903 | 41.097 | 10.1 | 10.1 | 10.1 |

*See the key of the first table.

In this test, the decomposition rate of the 1,1,1,2-tetrachloroethane amounts to 0.21.

b. Distillation of the same mixture of chlorinated organic compounds is carried out in the same manner as that of Example 1, but by adding therein 50 mg. of n-butyraldehyde(0.69 millimole) per kg. of organic compounds.

The molar balance of the column is then the following:

| Compounds | Feed in Moles | Residue in Moles | Distillate in Moles | Exhaust vent in Moles | Moles of trichloroethylene formed | Moles of 1,1,1,2-tetrachloroethane converted |
|---|---|---|---|---|---|---|
| HCl* |  |  |  | 6.70 |  |  |
| CV$_2$ | 0.352 |  | 0.352 |  |  |  |
| T111 | 2.680 |  | 2.680 |  |  |  |
| Tri | 5.360 | 0.030 | 12.030 |  | 6.70 |  |
| T112 | 0.076 |  | 0.076 |  |  |  |
| Per | 0.179 |  | 0.179 |  |  |  |
| T4D | 48.000 | 18.350 | 22.950 |  |  | 6.70 |
| T4S | 27.500 | 27.500 |  |  |  |  |
| Penta | 15.460 | 15.460 |  |  |  |  |
| Heavy | 0.393 | 0.393 |  |  |  |  |
| Total | 100.000 | 61.733 | 38.267 | 6.70 | 6.70 | 6.70 |

*See the key of the first table.

In this comparative test, the decomposition rate of the 1,1,1,2-tetrachloroethane is of about 0.14.

c. Distillation as in Example 1 of the same mixture of organic chlorinated compound as that of Example 1 is carried out except that only 50 mg. of tricresyl phosphate(0.136 millimole) is added thereto. The molar balance of the column is the following:

| Compounds | Feed in Moles | Residue in Moles | Distillate in Moles | Exhaust vent in Moles | Moles of trichloroethylene formed | Moles of 1,1,1,2-tetrachloroethane converted |
|---|---|---|---|---|---|---|
| HCl* | | | | 4.15 | | |
| CV$_2$ | 0.352 | | 0.352 | | | |
| T111 | 2.680 | | 2.680 | | | |
| Tri | 5.360 | 0.010 | 9.500 | | 4.15 | |
| T112 | 0.076 | | 0.076 | | | |
| Per | 0.179 | | 0.179 | | | |
| T4D | 48.000 | 22.400 | 21.450 | | | 4.15 |
| T4S | 27.500 | 27.500 | | | | |
| Penta | 15.460 | 15.460 | | | | |
| Heavy | 0.393 | 0.393 | | | | |
| Total | 100.000 | 65.763 | 34.237 | 4.15 | 4.15 | 4.15 |

* See the key of the first table.

It is found in test "c" that the decomposition rate of the 1,1,1,2-tetrachloroethane is of 0.0865.

The comparison of the results of tests a., b. and c. with that of Example 1 shows that the inhibition of the decomposition of 1,1,1,2-tetrachloroethane by a mixture of n-butyraldehyde and tricresyl phosphate provide an increase by a factor of 3.4 the simultaneous but independently inhibiting effects of each one of these 2 inhibiting compounds.

In effect, the decomposition rates of Example 1 and tests a, b and c are as follows:

| | |
|---|---|
| Example 1 | 0.0168 |
| Test a | 0.21 |
| Test b | 0.14 |
| Test c | 0.0865 |

The improvement in the decrease of the decomposition rate (inhibition) of Example 1, according to this invention, with regard to the decomposition rate of Test "a" is of 0.21/0.0168 = 12.5; with regard to Test "b" it is of 0.21/0.14 = 1.5; and with regard to Test "c" it is of 0.21/0.0865 = 2.43.

The decrease in the decomposition rate which should result from the simultaneous effect of the n-butyraldehyde and of the tricresyl phosphate and which could be expedted theoretically would be 1.5 × 2.43 = 3.65 wich regard to Test "a." Example 1 shows that in practice, the decrease of the decomposition rate wih regard to Test "a" is 12.5. Consequently, it results thereof a factor of the synergy of n-butyraldehyde and tricresyl phosphate of 12.5/3.65 = 3.4.

d. Also by way of comparison, there is submitted to distillation under the conditions of Example 1, the feed mixture of organic compounds of Example 1 except that it does not contain 1,1,1,2-tetrachloroethane and no inhibitor is added. A distillation residue is collect having the following compositions in moles:

| | |
|---|---|
| 1,1,2,2-tetrachloroethane | 27.000 |
| Pentachloroethane | 15.460 |
| Heavy | 0.393 |

The composition in moles of the distillate has been the following:

| | |
|---|---|
| Vinylidene chloride | 0.352 |
| 1,1,1-trichloroethane | 2.680 |
| Trichloroethylene | 5.360 |
| 1,1,2-trichloroethane | 0.076 |
| Perchloroethylene | 0.179 |
| 1,1,2,2-tetrachloroethane | 0.500 |

No appearance of hydrochloric acid has been noticed and the integrality of 1,1,2,2-tetrachloroethane of the feed has been recovered.

Thus, there is noticed that 1,1,2,2-tetrachloroethane is entirely stable to heat in the absence of any inhibiting agent whereas 1,1,1,2-tetrachloroethane has a heat behavior basically different of that it its isomer in the absence of inhibiting agent as furthermore shown by Test "a" hereinbefore.

EXAMPLE 2

An equimolar mixture of feed of 1,1,1,2-tetrachloroethane and of 1,1,2,2-tetrachloroethane containing 6 mg of dissolved iron(0.1075 milligram-atom) per kg of mixture to which there has been added 0.753 millimole of benzaldehyde and 0.214 millimole of tricresyl phosphate is subjected to distillation. After distillation of 5 hours, the decomposition rate of the 1,1,1,2-tetrachloroethane is 0.01 whereby 1,1,2,2-tetrachloroethane is entirely recovered.

By way of comparison, the distillation of the same mixture as that of Example 2, but not having undergone an addition of inhibiting agent sustains a decomposition rate of the 1,1,1,2-tetrachloroethane of 0.20 whereas 1,1,2,2-tetrachloroethane is entirely recovered.

It will be apparent from the foregoing that we have provided a new and improved method and composition for use in inhibiting 1,1,1,2-tetrachloroethane either alone or in admixture with other chlorinated solvents. The method of the present invention sufficiently improves the stability of 1,1,1,2-tetrachloroethane in the presence of metals which otherwise catalyze the decomposition of the 1,1,1,2-tetrachloroethane into trichloroethylene and HCl.

It will be understood that various changes and modifications may be made in the details of formulation, procedure and use without departing from the spirit of the invention, especially as defined in the following claims.

We claim:

1. A composition having improved stability in the presence of metal consisting essentially of 1,1,1,2-tetrachloroethane and an inhibitor consisting essentially of a mixture of (1) an aldehyde compound selected from the group consisting of trioxane, paracetaldehyde, the cyclic trimer of propionaldehyde, chloral, propionaldehyde cinnamaldehyde, anisaldehyde, salicylaldehyde, butyraldehyde, isobutyraldehyde, benzaldehyde and mixtures thereof, and (2) an organic phosphorus compound selected from the group consisting of alkylphosphates wherein the alkyl contains one to 12 carbon atoms, and arylphosphates wherein the aryl group contains six to 10 carbon atoms and is selected from the group consisting of phenyl, tolyl and naphthyl, with the aldehyde and the phosphorus compound each being present in an amount to provide at least 1 mole of each of the aldehyde and the phosphorus compound per gram atom of metal present in the dissolved or suspended state.

2. A composition as defined in claim 1 wherein said aldehyde is selected from the group consisting of butyraldehyde, isobutyraldehyde, benzaldehyde, a mixture of butyraldehyde and benzaldehyde, and a mixture of isobutyraldehyde and benzaldehyde.

3. A composition as defined in claim 1 wherein said aldehyde compound is present in a ratio of two to 100 moles of aldehyde compound per gram-atom of metal present in said composition.

4. A composition as defined in claim 1 wherein said organic phosphorus compound is present in a ratio of one to 10 moles of organic phosphorus compound per gram-atom of metal present in said composition.

5. A composition having improved stability in the presence of iron, copper and nickel metal and chlorides of iron consisting essentially of 1,1,1,2-tetrachloroethane and an inhibitor consisting essentially of an aldehyde selected from the group consisting of trioxane, paracetaldehyde, the cyclic trimer of propionaldehyde, chloral, propionaldehyde, cinnamaldehyde, anisaldehyde, salicylaldehyde, butyraldehyde, isobutyraldehyde, benzaldehyde and mixtures thereof, and an organic phosphorus compound selected from the group consisting of alkylphosphates wherein the alkyl contains one to 12 carbon atoms, and arylphosphates wherein the aryl group contains six to 10 carbon atoms and is selected from the group consisting of phenyl, tolyl and naphthyl, with the aldehyde and the phosphorus compound each being present in an amount to provide at least 1 mole of each of the aldehyde and the phosphorus compound per gram atom of metal present in the dissolved or suspended state.

6. In the method for the purification of crude 1,1,1,2-tetrachloroethane wherein the crude 1,1,1,2-tetrachloroethane is subjected to distillation at elevated temperatures in the presence of metal selected from the group of iron and alloys thereof, nickel and alloys thereof, copper and alloys thereof, and chlorides of the iron, the improvement comprising adding to the crude 1,1,1,2-tetrachloroethane is an inhibitor composition consisting essentially of an aldehyde compound selected from the group consisting of trioxane, paracetaldehyde, the cyclic trimer of propionaldehyde, chloral, propionaldehyde cinnamaldehyde, anisaldehyde, salicylaldehyde, butyraldehyde, isobutyraldehyde, benzaldehyde and mixtures thereof, and at least one organic phosphorus compound selected from the group consisting of alkylphosphates wherein the alkyl contains one to 12 carbon atoms, and arylphosphates wherein the aryl group contains six to 10 carbon atoms and is selected from the group consisting of phenyl, tolyl and naphthyl, with the aldehyde and the phosphorus compound each being present in an amount to provide at least 1 mole of each of the aldehyde and the phosphorus compound per gram atom of metal present in the dissolved or suspended state.

7. A method as defined in claim 6 wherein said aldehyde is selected from the group consisting of butyraldehyde, isobutyraldehyde benzaldehyde, a mixture of butyraldehyde and benzaldehyde, and a mixture of isobutyraldehyde and benzaldehyde.

8. A method as defined in claim 6 wherein the aldehyde inhibitor is added at the ratio of two to 100 moles of aldehyde compound per gram-atom of metal present.

9. A method as defined in claim 6 wherein said organic phosphorus is added in an amount to provide a ratio of from one to 10 moles of phosphorus compound per gram-atom of metal present.

10. A method as defined in claim 6 wherein the crude 1,1,1,2-tetrachloroethane is the effluent from a reactor in the preparation of chlorinated hydrocarbons.

11. A method as defined in claim 6 wherein the crude 1,1,1,2-tetrachloroethane is treated at a temperature within the range of 80°–250°C.

12. A method as defined in claim 6 wherein the crude 1,1,1,2-tetrachloroethane is treated in a column formed of a metal boiler which catalyzes the decomposition of 1,1,1,2-tetrachloroethane.

13. A method as defined in claim 12 wherein the inhibitor is added to the crude 1,1,1,2-tetrachloroethane prior to introduction to the column.

14. A method as defined in claim 12 wherein the inhibitor is added to the crude 1,1,1,2-tetrachloroethane as the crude 1,1,1,2-tetrachloroethane is introduced to the column.

15. A method as defined in claim 12 wherein the inhibitor is added to the crude 1,1,1,2-tetrachloroethane in the boiler of the column.

* * * * *